AZIMUTH MEASUREMENT
BY MECHANICAL SCANSION
WITH KNOWN RANDOM SIGNAL

INVENTOR.
CHARLES A. HAUER
BY
D R Pressman
ATTORNEY

Aug. 23, 1966           C. A. HAUER           3,268,893
ANGLE MEASURING RADAR UTILIZING BROAD BEAM SIGNAL OF
KNOWN FORM AND WAVEFORM RECOGNITION CIRCUITRY
Filed Oct. 8, 1963           4 Sheets-Sheet 2
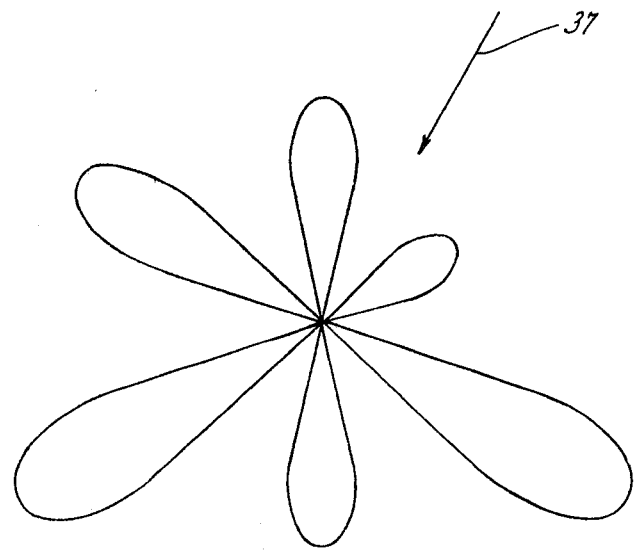
FIG. 1B.
KNOWN RANDOM RADIATION
PATTERN GENERATED BY ASSEMBLY 13
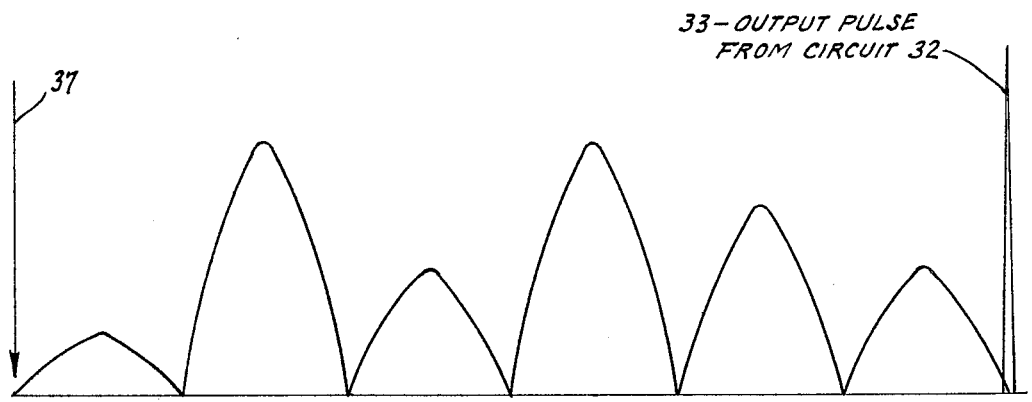
FIG. 1C. RECEIVED SIGNAL ECHO FROM, TARGET AT
ARBITRARY AZIMUTH (ALSO RESPONSE
PATTERN OF CIRCUIT 32)
INVENTOR.
CHARLES A. HAUER
BY
D R Pressman
ATTORNEY

AZIMUTH MEASUREMENT BY
ELECTRONIC SCANSION WITH
KNOWN RANDOM SIGNAL

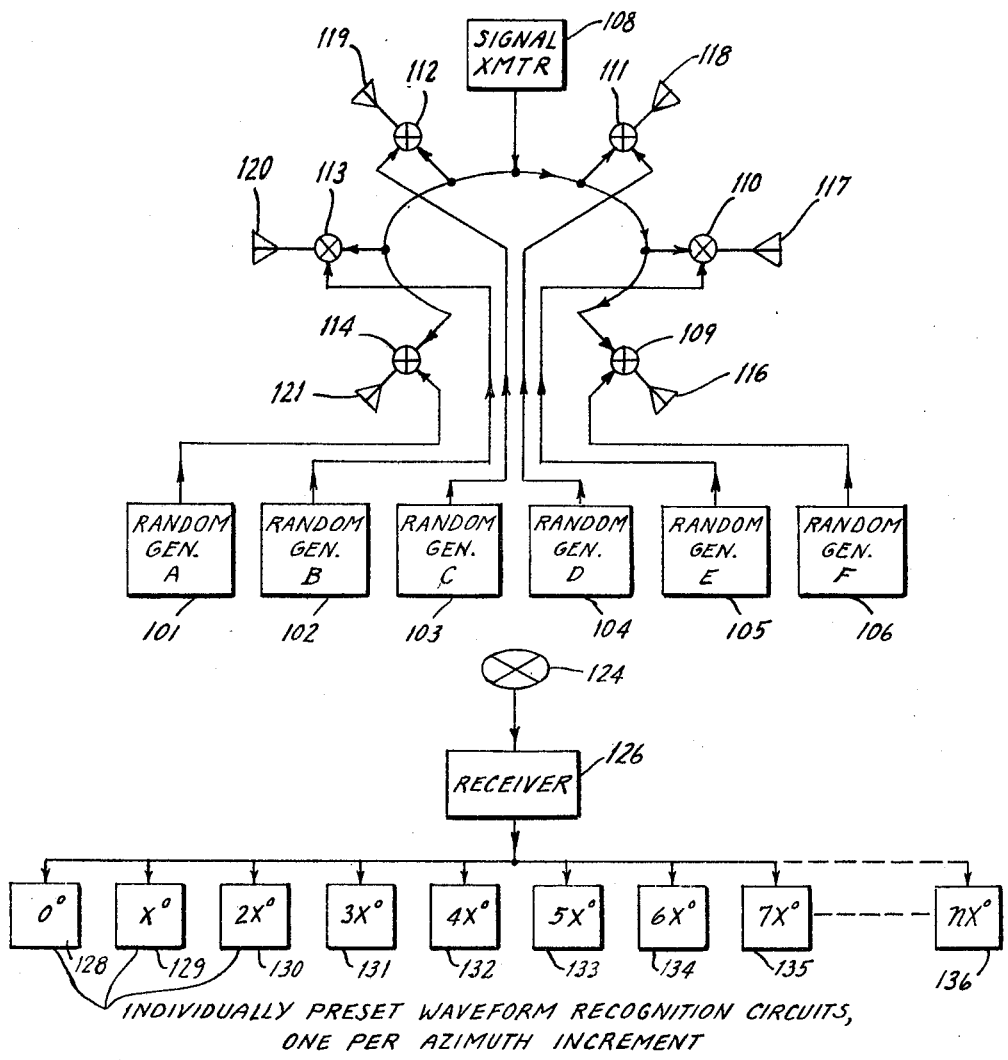
FIG. 3. AZIMUTH MEASUREMENT (NON-SCANSION) BY TRANSMISSION OF INDEPENDENT RANDOM SIGNALS WITH INDIVIDUAL AZIMUTH INDICATORS

United States Patent Office 3,268,893
Patented August 23, 1966

3,268,893
ANGLE MEASURING RADAR UTILIZING BROAD BEAM SIGNAL OF KNOWN FORM AND WAVEFORM RECOGNITION CIRCUITRY
Charles A. Hauer, Plymouth Meeting, Pa., assignor to Philco Corporation, Philadelphia, Pa., a corporation of Delaware
Filed Oct. 8, 1963, Ser. No. 315,122
11 Claims. (Cl. 343—16)

INTRODUCTION

This invention relates to radar systems and in particular to a new type of angle measuring radar system.

Radar is presently used to measure the angular direction (azimuth or elevation) of a target by sweeping a strong, narrow beam through an arc encompassing the target and noting the angle of the beam when an echo is received. This technique has several disadvantages. First, special expensive transmitters, waveguides, and antennas are necessary to handle the concentrated energy required. Second, it is easy for an enemy to detect the presence of the beam and thus ascertain the existence and location of the radar transmitter. Third, once the position of the transmitter is known its signal can be analyzed and jammed with spurious signals. Fourth, spurious signals of a friendly nature may cause self-jamming if they reach the highly directionally sensitive receivers used.

The desirability of a radar system for ascertaining target angle without the disadvantages concomitant to the use of a narrow, high energy beam therefore is manifest.

OBJECTS

Accordingly, several objects of the present invention are:

To provide a new and improved angle measuring radar system,

To provide a radar system for measuring azimuth or elevation angle which does not require a strong narrow scanning beam; and To provide angle measuring radar which is difficult to detect or jam and which does not require the special expensive components normally associated with radar systems employing high energy beams.

Other objects and advantages of the present invention will become apparent from a consideration of the ensuing description thereof.

SUMMARY

According to one embodiment of the present invention, target angle is measured by using a radiated signal whose far field spatial pattern is of known random form. This signal is swept across a sector encompassing the target. Circuitry at the receiver is arranged to recognize and note the time of reflection of the known random signal from the target and translate this time into the angle of the target.

According to another embodiment of the invention, target angle is measured by generating plural signals whose individual time variations as well as far field spatial patterns are of a known random form. The target-reflected waveform for each possible target angle will be different and a plurality of recognition circuits, one designed for each possible reflected waveform, are arranged to provide on indication of angle by the recognition by one of the units of the form of the target echo signal.

DRAWINGS

FIG. 1B is a plot of the radiation pattern generated by the assembly of FIG. 1A.

FIG. 1C is a plot of a target echo and response pattern in connection with the system of FIG. 1A.

FIG. 3 shows an embodiment of the invention for measuring target angle by transmission of independent random signals.

Figure 1A:
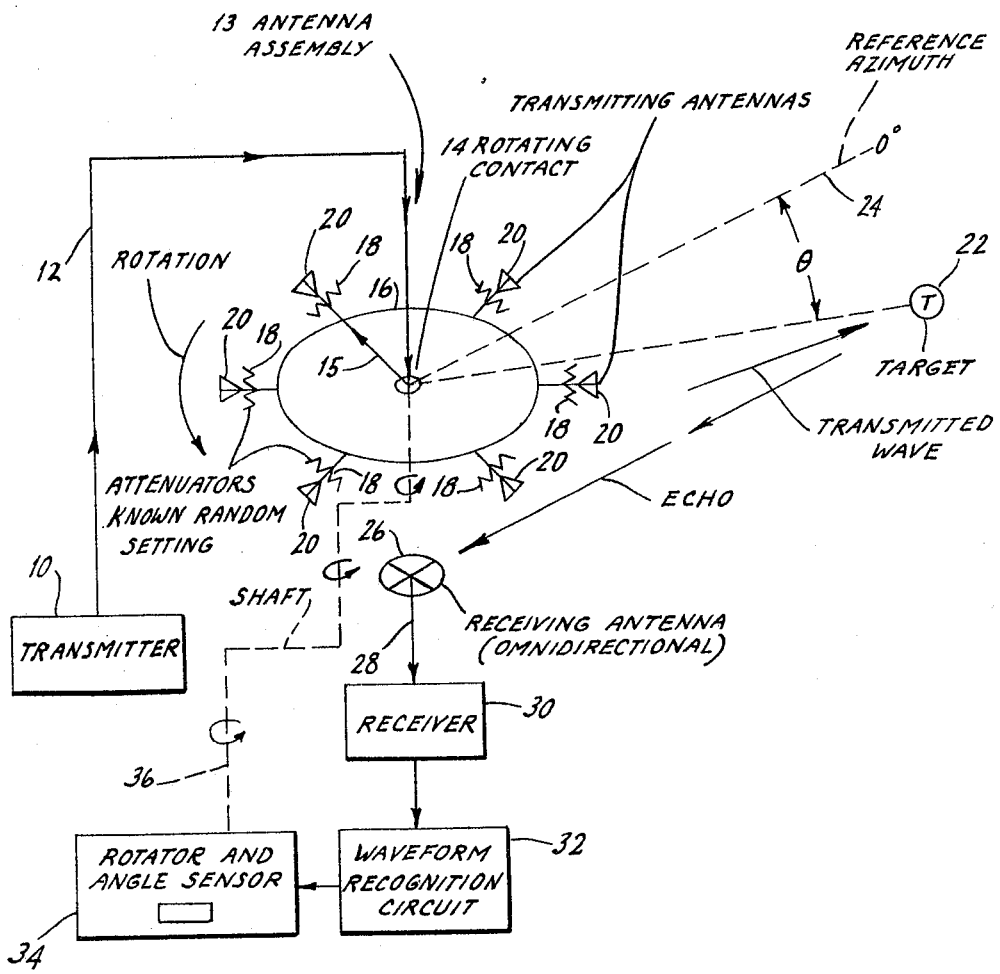
FIG. 1A shows an embodiment of the invention for measuring target angle which employs mechanical scansion with a known random waveform.

FIG. 1A.—Mechanical scansion method

*Description.*—The system shown in FIG. 1A is arranged to measure azimuth by physical rotation of an antenna which distributes a known random antenna pattern in the far field and reception and analysis of the target-reflected echo signal. The angular position of said antenna when an echo signal corresponding to said known random pattern is received indicates the angle of the target.

The system of FIG. 1A includes a transmitter 10; a rotatable antenna assembly 13 which may comprise, by way of example, a circular member 16, individual antennas 20, electrically and mechanically coupled to member 16 and respective attenuators 18; a receiving antenna 26; an associated receiver 30 which feeds waveform recognition circuit 32; and an associated antenna rotator and angle sensor 34.

Transmitter 10 is connected to antenna assembly 13 by waveguide 12 and rotatable coupler 14, which is shown in diagrammatic form. Assembly 13 including antennas 20, attenuators 18, member 16 and arm 15 is rotatable by means of a shaft represented diagrammatically by the broken line 36. Waveguide 12 is connected in parallel to attenuators 18 and antennas 20 by means of rotatable coupler 14 which makes a rotatable connection with radial arm 15.

Transmitter 10 is arranged to supply a continuous wave or pulsed radar frequency signal to waveguide 12. Waveguide 12, coupler 14, radial member 15, and circular parallel feed member 16 are all conventional signal transmission members. Attenuators 18 are designed to have "known random" settings, i.e., attenuators 18 have fixed individual values, these values varying from attenuator to attenuator in a random manner, the pattern of which is known. Antennas 20 and attenuators 18 are shown as six in number for convenience of illustration, but in practice many more than six could be employed.

A typical radiation pattern of assembly 13 is shown in FIG. 1B. The six lobes shown have random intensities as determined by the respective settings of attenuators 18. The spatial-intensity pattern of the resultant radiated signal as measured along any imaginary circular arc all points on which are equidistant from the antenna will thus have a plurality of peaks and valleys. A direction 37 on said pattern is arbitarily selected as the beginning thereof. This point lies on a reference radius of assembly 13, as will be discussed.

It will be apparent that in lieu of the arrangement shown in FIG. 1A, the random radiation pattern of FIG. 1B can also be generated by a single antenna arrangement which is rotatably through 360° and which has a gain which varies randomly in a known fashion as a function of angle. Such an antenna would be more efficient than the illustrated arrangement since no energy consuming attenuators would exist.

Receiving antenna 26 has a uniform response pattern for all directions. Receiver 30 is a conventional receiver which is arranged to amplify and amplitude demodulate received signals. As will be explained in more detail infra, waveform recognition circuit 32 is arranged to emit a pulse immediately after receipt of a signal whose amplitude characteristics are proportional to the intensity of the lobes of the radiation pattern of FIG. 1B and whose duration is the same as the time required for assembly 13 to complete one revolution. Circuits such as 32 are well known in the character recognition art, and may comprise, for example, a matched filter system in which samples taken of the incoming signal are fed to a delay line having output taps with individual attenuators whose values are proportional to the amplitude peaks of the signal to be recognized. The weighted taps are all connected to a voltage summation unit whose output is connected to a threshold circuit arranged to pass only pulses above a predetermined level.

The waveform shown in FIG. 1C represents the demodulated signal echo from a far field target at an arbitary azimuth; this waveform also represents the response pattern of circuit 32. Upon receipt of the signal shown in FIG. 1C, circuit 32 will emit an output pulse such as 33, which is shown on the same time scale as the received echo in FIG. 1C.

Antenna rotator and angle sensor 34 is arranged to (1) rotate shaft 36 and assembly 13 at a constant angular velocity and (2) monitor an angular position of a peripheral point on assembly 13 with respect to a fixed reference azimuth such as 24, and provide an indication of such position on receipt of a pulse from circuit 32. Such units are well known in the radar art and may provide an indication by means of an electron beam scanning a calibrated horizontal scale with a vertical excursion or "pip" being provided when unit 32 supplies a pulse thereto.

*Operation.*—Assume that a reference (0°) azimuth 24 is arbitrarily chosen and a reflective target 22 exists at an angle $\theta$ therefrom. Assume also that rotator 34 is rotating assembly 13 via shaft 36 so that the known random field strength pattern of FIG. 1B produced in the far field by attenna assembly 13 will be swept past target 22. The amplitude characteristics of the signal reflected from target 22 are shown in FIG. 1C. As soon as a complete pattern, starting with the reference 37, is swept past target 22, circuit 32 will emit a pulse. This will cause unit 34 to indicate the immediate angular position of assembly 13, which, of course, will be $\theta+360°$ or $\theta$, the azimuth of target 22.

If two targets are present, the received signal will be the sum of two signals having the amplitude versus time variations shown in FIG. 1C but having different times of arrival. Circuit 32 will recognize the two complete patterns and emit two pulses. Unit 34 will therefore indicate the angles of both targets.

Since, according to the invention, azimuth is measured by the arrival time of the radar echo, it might at first appear that the range of the target would affect accuracy by affecting the distance and thus time of the transmitted wave and its echo. This is not the case, however, since the radar wave travels at the speed of light while the peripheral velocity of the far field pattern of assembly 13 is of a far lower order of magnitude; thus while range errors exist, they are actually of insignificant magnitude. For example, with a scanning rate of 30 r.p.m., a 20 mile range variation would produce an error of only .0387 degree.

Figure 2:
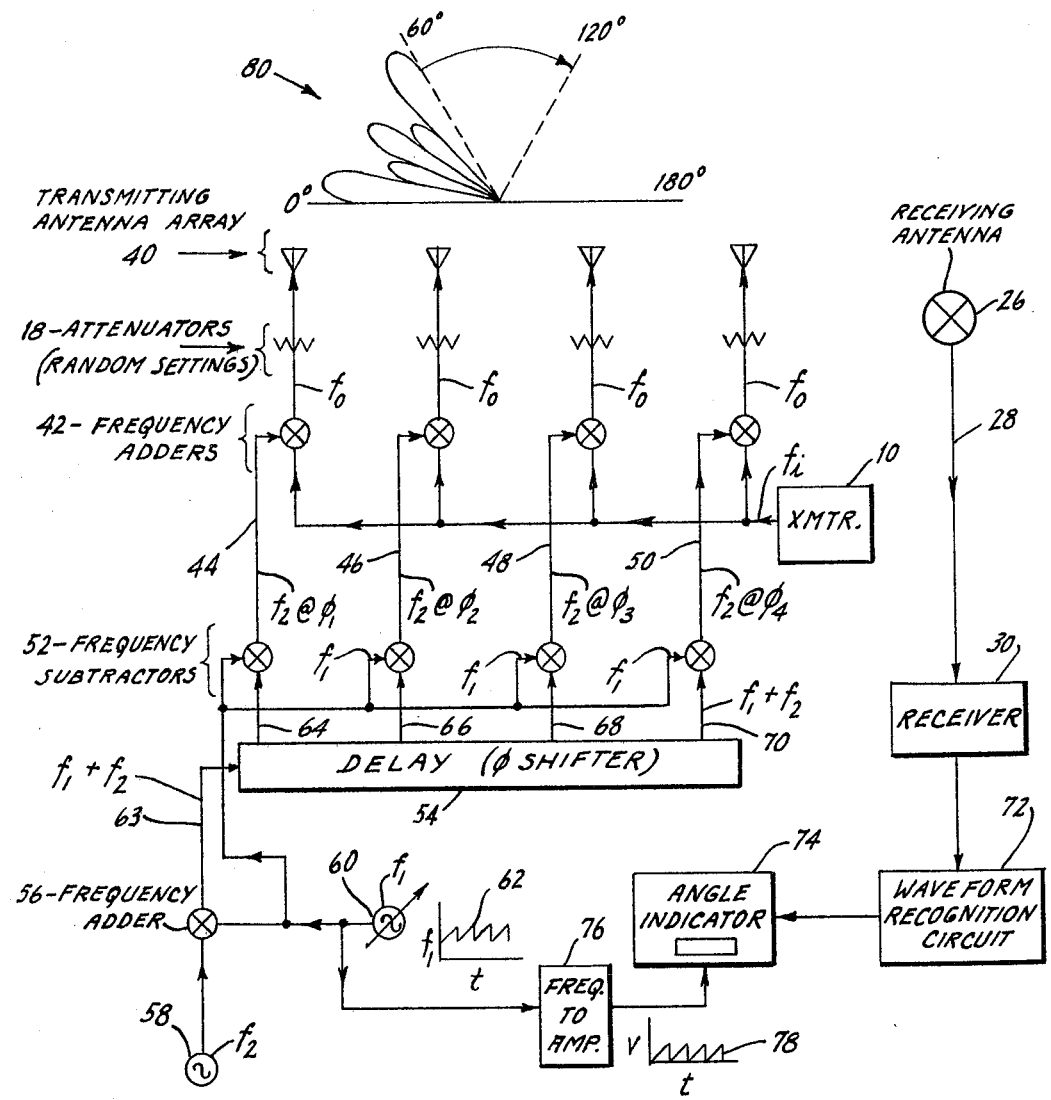
FIG. 2 shows an embodiment of the invention for measuring target angle which employs electronic scansion with a known random waveform.

*FIG. 2.—Electronic scansion method*

*Description.*—The embodiment of the invention shown in FIG. 2 operates according to the same principle as the embodiment shown in FIG. 1A. Like elements in FIGS. 1A and 2 have been given like reference numerals. However in lieu of physical rotation of the antenna, a fixed antenna incorporating electronic scanning is used. In one preferred form of an electronic scanning antenna system the phase of the signal supplied to one or more fixed antenna elements is varied so as to cause the main beam radiated by the antenna to scan across an arc. Electronic scanning methods per se are well known to those skilled in the art (see, e.g., "Survey of Electronically Scanned Antennas," by Shnitkin, The Microwave Journal, December 1960, pp. 67–72, and January 1961, pp. 57–64; "Electronic Scanning Radar Systems," by Forsberg and Kahrilas, Sperry Eng. Rev., December 1959, pp. 2–9; and "Introduction To Radar Systems," by Skolnik, McGraw-Hill, 1962, pp. 294–320). Therefore such scanning systems will not be discussed in detail in this specification.

The system of FIG. 2 provides means for supplying a signal of variable phase to each of the antenna elements in array 40 by way of its associated attenuator 18. This is accomplished as follows.

Oscillators 58 and 60 are connected to the inputs of a frequency adder (i.e., a mixer+"sum" filter) 56, the output of which is connected to the input of delay 54. Delay 54 is a tapped delay line which provides a greater phase shift as the frequency of the signal thereto is increased. The output of oscillator 60 is also connected to the input of a frequency-to-amplitude converter 76 and in parallel to one input of each of frequency subtractors 52, each of which may comprise a mixer plus "difference" filter. The output taps of delay 54 are connected respectively to the other inputs of subtractors 52. The outputs of subtractors 52 are connected respectively to one of the inputs of frequency adders 42, the other input of each adder being supplied in parallel by transmitter 10. The output of each adder 42 is connected to one of antennas 40 via respective attenuators 18.

Receiving antenna 26 is connected to receiver 30, the output of which is connected to the input of wavefrom recognition circuit 72 which is similar to circuit 32 of FIG. 1A. Angle indicator 74, connected to the outputs of circuit 72 and converter 76 is arranged to provide an angular indication related to the magnitude of the output voltage from converter 76 when actuated by circuit 72. Oscillator 58 is arranged to generate a continuous signal of frequency $f_2$. Oscillator 60 is arranged to generate a signal nominally designated $f_1$ which, as indicated by waveform 62, repeatedly rises in linear fashion from a first value to a second higher value and instantly returns to its first value. When the $f_1$ and $f_2$ signals are combined in adder 56, a signal, nominally designated $f_1+f_2$, appears on lead 63 which signal is similar in form to signal $f_1$ (waveform 62) except that the first and second frequency values are higher by the frequency of signal $f_2$.

Delay 54 provides at its output taps progressively delayed versions of the signal on lead 63. Delay 54 is frequency sensitive; that is, the inter-tap phase shift becomes greater when the frequency of the signal supplied thereto increases. Frequency subtractors 52 combine the signals of frequency $f_1+f_2$ at the output taps of delay 54 with signal $f_1$ to provide signals of frequency $f_2$ on leads 44, 46, 48, and 50. These latter signals are combined with the signal $f_i$ from transmitter 10 to provide output signals $f_0$ which are fed to the respective attenuators 18.

Attenuators 18 have random settings, designed to cause antenna array 40 to produce a multi-lobed radiation pattern as shown at 80.

The antennas in array 40, which is designed for electronic scanning, are shown as four in number for illustrative purposes but many more antennas than shown would be used in a practical arrangement. Array 40 is designed to produce, in conjunction with attenuators 18, the pattern shown at 80. When the respective signals $f_0$ supplied to array 40, which are progressively retarded in phase, are simultaneously made to continuously shift to respective new phase positions, the radiation pattern 80 will be swept from its present position (0–60°) across the 60–120° arc to a new position in the 120–180° arc. The pattern 80 will return instantly to its original position as the phases of the signals $f_0$ are returned to their original value.

Receiving antenna 26 has a uniform response characteristic within the 60–120° arc shown. Receiver 30 is conventional. Waveform recognition circuit 72 is designed to produce a pulse immediately after receipt of a signal having amplitude characteristics similar to the lobe characteristics of pattern 80.

Frequency-to-amplitude converter 76 may comprise a detector, shunt inductor, and filter. It changes the frequency excursions of the $f_1$ signal (shown in waveform 62) to proportional amplitude excursions on the same time scale as shown in waveform 78. The output signal from converter 76 is used by indicator 74 to provide a horizontal sweep trace. The pulses from circuit 72 are used to create vertical pips on said trace to indicate the presence of a target. Indicator 74 has a horizontal scale suitably calibrated in angular units.

*Operation.*—When the frequency varying signal $f_1$ from oscillator 60 is combined with constant frequency signl $f_2$ from oscillator 58 in adder 56, a signal $f_1+f_2$ is provided on lead 63 which has frequency excursions similar to those of waveform 62. This signal is applied to delay 54.

At the output taps 64, 66, 68, and 70 of delay 54 will appear progressively phase shifted versions of the original signal $f_1+f_2$ which was present on lead 63. As the signal $f_1+f_2$ on lead 60 increases in frequency during a cycle of waveform 62, the phases of the signals on the output taps of delay 54 will all undergo further continuous phase shifts and thereafter instantly return to their lower values when the frequency of the signal on lead 60 returns to its lowest value. The frequency variations of the signals on taps 64, 66, 68, and 70 are removed in subtractors 52 when the frequency of signal $f_1$ is subtracted therefrom, leaving only phase variable signals of frequency $f_2$ on leads 44, 46, 48, and 50. These latter signals are heterodyned with signal $f_1$ to provide the output signals $f_0$ in adders 42. Signals $f_0$ have progressively different initial phase values which all increase to new values and return during a cycle of the signal $f_1$.

Signals $f_0$ are sent to array 40 via the respective attenuators 18, which are adjusted to produce the multilobed radiation pattern 80. As signals $f_0$ simultaneously change in phase, pattern 80 will be caused to sweep from the 0–60° position. If one or more reflective targets are present in the 60–120° arc, a radar echo signal which is amplitude modulated according to the intensity characteristic of the lobes of pattern 80 will occur and be intercepted by receiving antenna 26. The timing of this signal is, of course, indicative of the exact target azimuth.

The echo signal signal will be amplified and detected in receiver 30 and the resulting amplitude modulation will be supplied to waveform recognition circuit 72. When circuit 72 is supplied with a demodulated signal conforming to the intensity characteristic of pattern 80, it will supply a pulse to indicator 74. The timing of this pulse will be representative of the position of the target within arc 60.

Waveform 78 from converter 76 is supplied to indicator 74 to create a horizontal trace. A pulse applied to indicator 74 from circuit 72 may be used to create a pulse or pip on the horizontal trace at the proper instant to indicate target azimuth. The horizontal scale of indicator 74 should be empirically calibrated in units of angle.

The electronic scanning system of FIG. 2 is adapted to measure the location of a target located within a 60° arc. It will be apparent, however, that the electronic scanning method of azimuth measurement according to the invention is not limited to relatively narrow arcs, the 60° system of FIG. 2 being illustrative only. More complex electronic scanning systems capable 360° operation are known, and the invention is fully applicable thereto. One such 360° electronic scanning system employs beam switching in conjunction with a Luneberg lens having a plurality of input and output feeds.

FIG. 3.—*Random signal method*

*Description.*—The system of FIG. 3 is adapted to measure the azimuth of a target without the need for scanning in the conventional sense; "scanning" is here accomplished by repetitively transmitting simultaneously a plurality of known random signals in a plurality of directions.

The upper part of FIG. 3 is the transmitting portion of the system and the lower part is the receiving portion. The transmitting portion includes a plurality of random signal generators 101 to 106, a signal transmitter 108, a plurality of mixers 109 to 114, for combining the signals from generators 101 to 106 with the signal from transmitter 108, and a plurality of transmitting antennas 116 to 121 which radiate the signals provided by mixers 109 to 114. The output of transmitter 108 is connected in parallel to one input of each of the mixers and the other input of each mixer is connected to a respective one of the random signal generators. The output of each mixer is connected to a signal transmitting antenna.

The receiving part of the system comprises an omnidirectional receiving antenna 124, a receiver 126, and individual waveform recognition circuits 128 to 136, the output of the receiver being connected in parallel to the inputs of all the recognition circuits.

The functions of the individual elements in the transmitting portion of the system are as follows: Random generators 101 to 106 each produce a signal which repeats cyclically in periods of a fixed duration (e.g., several seconds). Each signal has random amplitude variations within a period. The same amplitude variations are produced in successive cycles of the signal. Each generator should provide a random signal which is different from that provided by any of the other generators. Signal transmitter 108 provides a continuous radar frequency signal. Mixers 109 to 114 are arranged to amplitude modulate the signal supplied by transmitter 108 with the individual random signals.

Antennas 116 to 121 are arranged aggregatively to radiate the signals supplied thereto throughout a flat cylindrical volume, but any other volume (such as a cylindrical sector or a solid angle) can be scanned according to the invention. In relation to the size of the volume scanned, antennas 116 to 121 can effectively be considered a point source from which radial target angles can be reckoned. Antennas 116 to 121 should be broadly directional so that every point on the volume scanned receives overlapping signal contributions from at least two antennas. Every radius traced from the antennas through the volume should receive substantially the same ratio of signal contributions from like antennas throughout its length. The antennas are shown as six in number for convenience of illustration, but a much larger number would be used in practice to cover adequately a cylindrical volume.

In the receiving portion of the system, antenna 124 is omnidirectional. Receiver 126 is arranged to amplify and detect echoes of the signals radiated by antennas 116 to 121. Recognition circuits 128–136 each represent a particular angular position in the volume illuminated by the transmitting antennas. The angular coverage capabilities of the system are determined by the number of recognition circuits employed. Each circuit represents an azimuth $x°$ away from its adjacent circuits. Since the azimuthal coverage of the system is 360° the number $n$ of individual circuits for complete coverage will be $360/x$. Each circuit may be a matched filter system similar to circuit 32 of FIG. 1 which is empirically designed to recognize the unique composite waveform which will be reflected when a target is present at the particular azimuth represented by the circuit. Indication that a signal has been recognized may be provided by a light on each recognition circuit.

*Operation.*—Target azimuth is measured in the system of FIG. 3 by transmitting plural signals to create a different radiated time pattern signal at each possible azimuth in the far field. A target at any particular azimuth is recognized by reception of an echo whose time pattern is identical to the signal present at that azimuth.

More particularly, each of random signal generators 101–106 produces a signal different from any other generator. Each random signal amplitude modulates the signal from transmitter 108 in a respective one of mixers 109 to 114. Thus each of antennas 116 to 121 radiates a signal which is different than that of any other antenna. At every azimuth in the volume scanned the radiated signal will be formed of the contributions of the signals from several antennas. No two azimuths in the far field will receive identical signal contribution from the same antennas; thus every azimuth will receive a unique composite signal. A target at any azimuth will reflect the unique signal present at that azimuth back to the transmitter.

Antenna 124, positioned to receive only reflected signals, will pick up and send the reflected signal to receiver 126, and the correct one of recognition circuits 128–136 will respond; thus the azimuth of the target will be indicated.

Circuits 128–136 are designed empirically by first measuring and recording the time variation of the radiated signal for every possible azimuth. This can be done by using a highly directional antenna. The appropriate respective waveform recognition circuits are then designed to match the recorded time variations representative of that azimuth.

The positioning of antennas 118 is not critical or necessarily symmetrical so long as every possible far field azimuth receives a different time-variable signal.

In all of the embodiments of the present invention a transmitted random signal incorporating energy dispersed over a wide angle has been used. An enemy consequently has great difficulty in detecting the presence of the radar, and more so in detecting the characteristics of the radar signal due to its random form. Also spurious signals are not likely to jam the radar since the receivers used are arranged to respond only to signals of a particular form. Use of the invention vis-a-vis narrow beam scanning radar involves no sacrifice in signal-to-noise ratio since the energy from an entire random pattern is used to produce an azimuth indication.

While the invention has been discussed as an azimuth measuring device, it is fully capable of measuring elevational angles in the same manner. Various other modifications of the inventive concept will occur to those skilled in the art and accordingly the specificities of the specification should not be construed as limiting the scope of the invention, which is defined only by the appended claims.

I claim:

1. In combination:
   (a) a plurality of directional antennas arranged to aggregatively radiate, from a substantial point source, signal energy throughout a given volume such that every point in said volume receives signal energy from at least two antennas, the ratio of signal energy contributions from like antennas being substantially the same along every straight line extending from said point through said volume,
   (b) a corresponding plurality of signal sources, each arranged to repetitively supply a signal of predetermined duration to one of said antennas, each signal being of a unique form, whereby each radial angle in said volume will be supplied with a unique composite signal,
   (c) receiving means arranged to receive echoes of said signal energy from targets positioned in said volume,
   (d) a plurality of waveform recognition circuits connected in parallel to an output of said receiving means, each representative of a particular radial angle in said volume and arranged to provide an indication upon recepit of the unique composite signal for said particular radial angle.

2. A radar system comprising:
   (a) a source of a radar frequency signal,
   (b) antenna means arranged to broadly radiate said signal in at least a given volume such that at any instant the spatial-intensity pattern of said signal measured along a circular arc all points on which are equidistant from said antenna will have at least a plurality of peaks and one valley,
   (c) means for causing said radiated signal pattern to sweep through a given angle about said antenna as a center, and
   (d) means for providing an indication only in response to each object-reflected echo of said signal whose time-intensity variations correspond to said spatial-intensity pattern of said radiated signal along said arc.

3. The system of claim 2 wherein said means of clause (c) comprises means for physically rotating said antenna means.

4. The system of claim 2 wherein said antenna means comprises a fixed array of antennas and said means of clause (c) comprises means for electronically rotating said radiated signal pattern about said antenna means.

5. The system of claim 2 further including means responsive to said means of clause (d) for indicating the angular deviation from a reference radius extending from said antenna means of the source of each echo of said radiated signal.

6. A radar system for ascertaining the angle of a reflective target positioned within a given volume with reference to a fixed reference line extending from a point in said volume, comprising:
   (a) means for supplying a plurality of repetitive signals, each signal being of a fixed duration and form,
   (b) means at said point for transmitting said signals in a respective plurality of different and fixed directions such that the radiant energy at each point in said volume is formed of over-lapping contributions of at least two of said signals and such that the resultant signal transmitted to each of a plurality of angular positions in said volume has a unique and repetitive form, and
   (c) means for ascertaining the presence of a target at one of said angular positions, said means comprising a plurality of waveform recognition circuits, one for each of said angular positions, each circuit arranged to recognize echoes of the unique signal transmitted at its corresponding angular position.

7. The system of claim 6 wherein said means of clause (c) comprises an omnidirectional receiving antenna and a receiver connected to said antenna, said receiver arranged to supply said waveform circuits in parallel.

8. In combination:
   (a) a source of a radar-frequency signal,
   (b) transmitting antenna means arranged to radiate said signal such that the far field spatial intensity pattern of said signal measured along an arc every point of which is equidistant from said antenna has a predetermined varying form,
   (c) means for rotating said antenna means so that the signal radiation pattern thereof is rotated about said antenna as a center,
   (d) omnidirectional receiving antenna means positioned at substantially the same location as said transmitting antenna means and arraged to receive any echo of said radiated signal from a far-field reflective target, (e) a receiver connected to said receiving antenna means and arranged to receive and demodulate echoes of said radiated signal, (f) a waveform recognition circuit connected to said receiver and arranged to supply a predetermined output in response to an output of said receiver whose time-amplitude variation corresponds to said spatial intensity pattern of said radiated signal, and (g) indicating means responsive to the angular orientation of said antenna means and said predetermined output of said waveform recognition circuit for providing an indication representative of the angular orientation of said target.

9. The combination of claim 8 wherein:

(a) said transmitting antenna means comprises a plurality of radiating elements connected to said signal source via a respective plurality of attenuators, said attenuators having predetermined attenuation values, and (b) said waveform recognition circuit is responsive to a signal whose time-amplitude characteristic is inversely proportional to the attenuation values of said attenuators.

10. In combination:

(a) scanning means arranged to (1) radiate a signal in a radiation pattern having a plurality of lobes of different and predetermined intensities and (2) cause said radiation pattern to sweep through an arc centered at said scanning means, whereby a reflective target in the path of said signal will provide a signal echo having a time-amplitude characteristic proportional to the intensities of the lobes of said radiated signal, (b) a receiving antenna located adjacent the center of rotation of said pattern and having a substantially uniform response characteristic to signal echoes from targets in the sector defined by said arc, (c) a receiver connected to said antenna and arranged to recover the amplitude modulation envelope of signals supplied thereto by said antenna, (d) a waveform recognition circuit connected to said receiver and arranged to supply a predetermined output in response to a signal having a time-amplitude characteristic corresponding to the spatial-amplitude characteristic of said radiated signal, and (e) means coupled to said scanning means and responsive to the output of said recognition circuit for indicating the angular orientations of targets causing said signal echoes.

11. The combination of claim 10 wherein said scanning means includes:

(a) a scanning array composed of a plurality of antennas, (b) means for providing a respective plurality of scan producing signals having progressively different phases which all cyclically shift continuously from a first set of values to a second set of values and instantly return to said first set of values, and (c) a respective plurality of attenuator means arranged to couple said scan producing signals to said antennas and cause said array to radiate said multi-lobed pattern.

References Cited by the Examiner

UNITED STATES PATENTS

| | | | |
|---|---|---|---|
| 2,403,728 | 7/1946 | Loughren | 343—100.6 |
| 2,557,869 | 6/1951 | Gloess | 343—11 |
| 2,938,205 | 5/1960 | Mandel | 343—106 |
| 3,113,310 | 12/1963 | Standing | 343—16 |

CHESTER L. JUSTUS, *Primary Examiner.*

LEWIS H. MYERS, *Examiner.*

R. E. KLEIN, R. D. BENNETT, *Assistant Examiners.*